United States Patent
Cote et al.

(10) Patent No.: US 8,533,393 B1
(45) Date of Patent: Sep. 10, 2013

(54) DYNAMIC CACHE EVICTION

(75) Inventors: Pierre Paul Cote, Redmond, WA (US); Waclaw T Antosz, Woodinville, WA (US); Eric Hammer, Bellevue, WA (US)

(73) Assignee: Expedia, Inc., Bellevue, WA (US)

( * ) Notice: Subject to any disclaimer, the term of this patent is extended or adjusted under 35 U.S.C. 154(b) by 281 days.

(21) Appl. No.: 12/967,727

(22) Filed: Dec. 14, 2010

(51) Int. Cl.
G06F 12/00 (2006.01)
G06F 13/00 (2006.01)
G06F 13/28 (2006.01)

(52) U.S. Cl.
USPC ............................ 711/118; 711/154; 711/171

(58) Field of Classification Search
USPC .................................................. 711/135, 118
See application file for complete search history.

(56) References Cited

U.S. PATENT DOCUMENTS

| | | | |
|---|---|---|---|
| 6,453,404 B1* | 9/2002 | Bereznyi et al. | 711/171 |
| 6,760,813 B1* | 7/2004 | Wu | 711/133 |
| 7,076,611 B2* | 7/2006 | Steere et al. | 711/133 |
| 7,454,571 B1* | 11/2008 | Sucharitakul | 711/129 |
| 2004/0098541 A1* | 5/2004 | Megiddo et al. | 711/129 |
| 2006/0069871 A1* | 3/2006 | Gill et al. | 711/118 |
| 2008/0222359 A1* | 9/2008 | Ninomiya et al. | 711/122 |
| 2010/0153652 A1* | 6/2010 | Thomas et al. | 711/136 |

* cited by examiner

*Primary Examiner* — Jared Rutz
*Assistant Examiner* — Prasith Thammavong
(74) *Attorney, Agent, or Firm* — Knobbe Martens Olson & Bear, LLP (57) ABSTRACT

A cache manager monitors storage capacity levels of a cache node storing data as cache entries. Upon determining a storage capacity threshold is reached, the cache manager begins evicting cache entries. In evicting the cache entries, the cache manager identifies a reduction level, and configures one or more time steps. The cache manager evicts cache entries within the one or more time steps until the reduction level is achieved.

25 Claims, 4 Drawing Sheets

DYNAMIC CACHE EVICTION

BACKGROUND

Computer and network systems often employ caching techniques to improve system performance and return data to a client faster than if the data came from storage directly. Some cache systems involve multiple caches, or cache nodes, that store different data based on a storage policy. For example, one cache node may store airfare search results, while another stores hotel search results, and yet another stores rental car search results. Using the storage policy, routers intelligently route client requests to the appropriate cache node based on the search. If the results are found, they are returned to the client. If the results are not found, the client must search somewhere else. Once the data is found, it is stored in the cache node for future reference, according to the storage policy.

Over time, the data stored in the cache node is removed or replaced, which may also be referred to as an "eviction." Various techniques can be used to determine which data to evict. For example, some cache systems remove data from a cache node once the data has changed in a corresponding database. Other cache systems evict data after it has expired, i.e., after a certain time has elapsed since a first search returned said data, after there has been no request for the data after a certain time, etc.

Unfortunately, at times there is more data to store than the cache node can accommodate. Even though the cache node is evicting the expired data, more data is being added to the cache node than removed. In these instances, cache nodes run the risk of running out of storage space and either randomly deleting data, without knowing how old the deleted data are of if they should be evicted, or not storing the new data. Thus, the cache node may delete data that should remain, while leaving entries that should be evicted.

BRIEF DESCRIPTION OF THE DRAWINGS

The forgoing aspects and many of the attendant advantages will become more readily appreciated as the same become better understood by reference to the following detailed description, when taken in conjunction with the accompanying drawings.

DETAILED DESCRIPTION

Embodiments of the present disclosure provide systems and methods for the dynamic eviction of data from a cache node stored as cache entries in the cache node. In particular, a cache manager monitors cache capacity levels. Upon determining that the cache capacity has reached or exceeded a threshold, the cache manager identifies a reduction level (e.g., an amount of data to remove), configures a number of time steps between a first cache entry and an end position, and evicts the cache entries within each time step until the reduction level is achieved.

In one non-limiting example, a cache node has the capacity to store data as 100 cache entries, and currently has 80 cache entries stored. For simplicity, in this example, each cache entry uses one unit of storage; however, in application the size of each cache entry can vary substantially. The oldest cache entry has a time stamp of time 0 min., and the newest cache entry has a time stamp of time 50 min. In this example, a cache manager activates an eviction routine once a threshold capacity of 90% is reached, i.e., when 90 or more cache entries are stored. Once the threshold capacity is reached, the cache manager determines a cache reduction level, or a reduction goal. In this example, the reduction goal is a 20% decrease in used storage. However, other reduction parameters can be used, such as an overall system threshold level, a set amount of storage space to be made available, or the like.

The cache manager also configures a number of time steps between a first cache entry and an end position, such as the most recent cache entry, the current time, or the like. In configuring the time steps, the cache manager configures the total number of time units or steps to use, the size between each step, etc., which may be predefined or configured on an ad-hoc basis. In this example, the cache manager configures the number of time steps between the oldest cache entry and the most recent cache entry to be ten and the step size between steps to be five minutes. Thus, the first time step is 0-5 min., the second time step is 5-10 min., and so on up to 50 min. Each time step may include a different number of cache entries as the cache entries may or may not have been stored at uniform time periods. For example, the first time step may include 3% of the cache entries, while the second, third, and fourth time steps include 10%, 15%, and 6% of the cache entries, respectively.

Once the cache reduction level is determined and the time steps configured, the cache manager begins evicting cache entries. In this example, the cache entries within the first time step are evicted first. Thus, all cache entries with a time stamp between 0-5 min. are evicted. At least one cache entry will be evicted, as the oldest cache entry has a time stamp of 0 min. Any other cache entries with a time stamp between 0-5 min. will also be evicted. After removing the cache entries in the first time step, the cache manager determines if 20% of the storage space has been freed up, i.e., if the desired reduction level has been achieved. If the reduction level has not been achieved, the cache manager removes the cache entries in an additional time step and determines, again, if the desired reduction level has been achieved. In this example, the cache manager determines that only 3% of the cache entries have been evicted after the first time step. Thus, the cache manager continues to evict the cache entries within a second and third time step, which results in a total eviction of 28% of the cache entries, surpassing the reduction level by 8%. Once the reduction level has been achieved, the cache manager returns to monitoring the cache levels.

Figure 1:
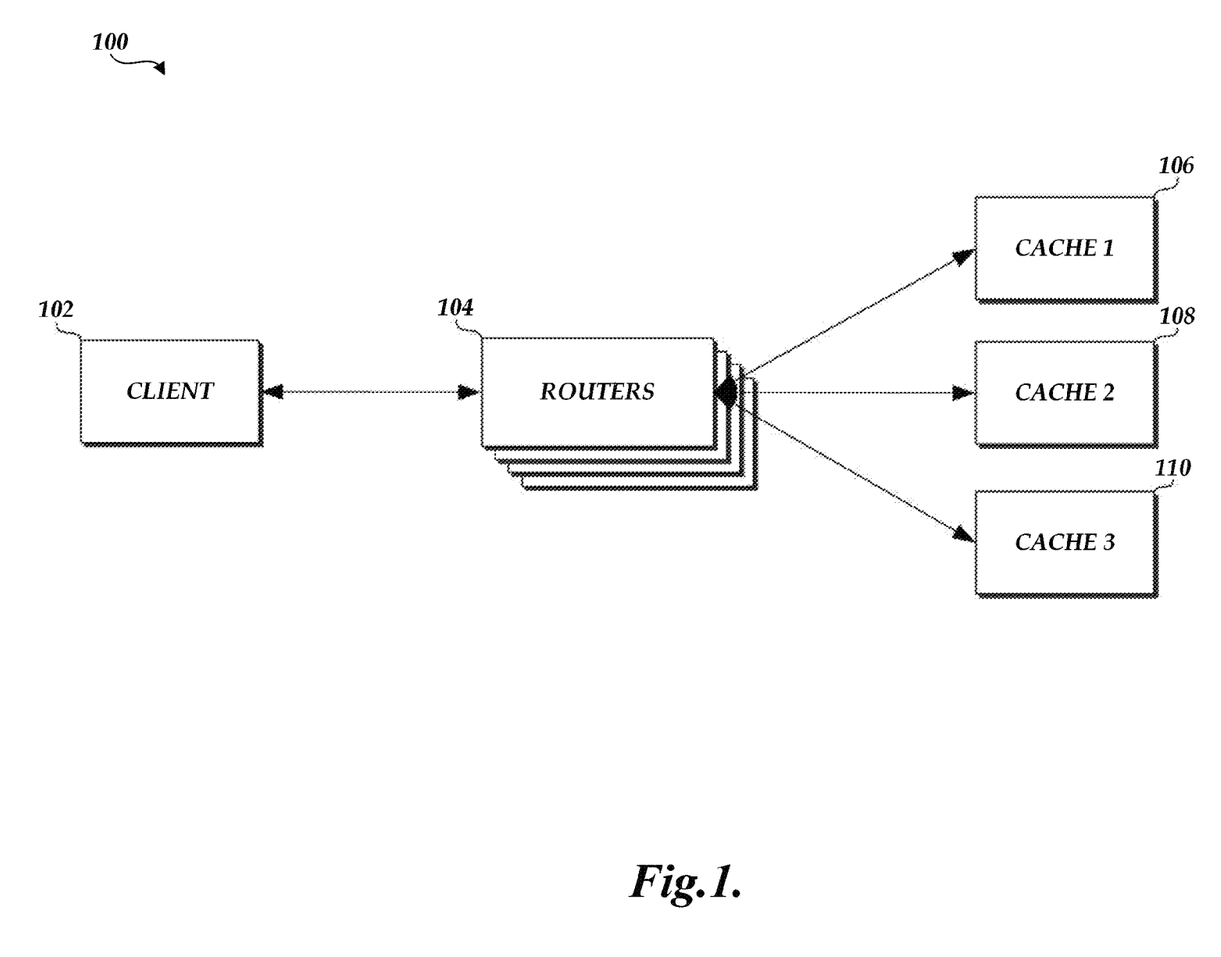
FIG. 1 is a schematic block diagram of an illustrative multicache storage environment.

With reference to FIG. 1, an illustrative multicache storage environment 100 is shown, including a client 102 in communication with one or more routers 104, which routers are in communication with a number of caches nodes 106, 108, 110. The client 102 requests data from the cache nodes 106, 108, 110 via one or more routers 104. The client 102 may correspond to a wide variety of computing devices including server computing devices, personal computing devices, laptop computing devices, tablet computing devices, hand-held computing devices, terminal computing devices, electronic book reader devices, mobile devices, wireless devices, various electronic devices, appliances and the like. The client 102 includes necessary hardware and software components for establishing communication with one or more of the routers 104. For example, the client 102 may be equipped with networking equipment and browser software applications that facilitate communication with the routers 104. Although not illustrated in FIG. 1, client 102 may also display a user interface. The user interface may include various menus and fields for entering and displaying data. The user interface may further present the results of any data retrieved from the cache nodes 106, 108, 110 in an easy to understand format. Although only one client 102 is depicted in FIG. 1, those skilled in the art will appreciate that multiple clients may communicate with router(s) 104 and obtain data from one or more of the cache nodes 106, 108 and 110.

With continued reference to FIG. 1, each router 104 may be implemented in software, hardware or a combination thereof and form part of any number of different networks including a wide area network, a local area network, a satellite network, a cable network, a personal area network, or the like. The network may be a wireless network, wired network, or a combination thereof. In one embodiment, the routers 104 form part of the Internet or an intranet. The routers 104 may include a router master, which implements logic to determine in which cache node 106, 108, 110 to store data and from which cache node to retrieve data. In one embodiment, the logic forms part of a storage policy.

The various cache nodes 106, 108, 110 may form part of a multicache system. In one embodiment, each cache node includes one or more data storage devices or systems, e.g., cache servers, Web service storage systems, etc. In addition, the cache nodes may be logically grouped into one or more cache clusters, or the like. The various cache nodes 106, 108, 110 may be located in close proximity to each other or remotely from one another. For example, the cache nodes 106, 108, 110 may be located together in a room, or in different cities, states or even countries. For example, the cache node 106 may be located Denver, the cache node 108 may be located in Chicago, and the cache node 110 may be located in New York City.

Cache nodes 106, 108, 110 store data as cache entries according to a storage policy. The amount of data in each cache entry may or may not be uniform, and the size of each cache entry can vary substantially. In one embodiment, each cache entry includes a time stamp, which will be described in greater detail below. The storage policy dictates which data is stored in which cache node. The storage policy can use location information, specific data information (e.g. subject matter, size, etc.) or the like to determine which data is stored in which cache. For example, the cache node 106 may store data relating to car rental searches, the cache node 108 may store airfare search results, and the cache node 110 may store hotel search results. Alternatively, the cache node 106 may store data relating to recent searches from users in a particular geographic area (e.g., Denver) regardless of the type of data or its content. Similarly, the cache node 108 and the cache node 110 can store data relating to searches from clients located in the Chicago and New York area, respectively. The storage policy can be implemented by any one of, or a combination of, the routers 104 and/or cache nodes 106, 108, 110, or by a separate storage manager. The storage policy can also determine which cache node to search upon receiving a request for certain data from the client 102. The routers 104 can use the storage policy to determine which cache node 106, 108, 110 is likely to have the requested data. Thus, only the relevant cache node 106, 108, 110 is searched.

Although not illustrated in FIG. 1, the multicache storage environment can also include a database storing all the data stored in the different cache nodes 106, 108, 110. The database also includes information not stored in the cache nodes 106, 108, 110. Moreover, although only three cache nodes are depicted in FIG. 1, those skilled in the art will appreciate that a larger or smaller number of cache nodes may be utilized without departing from the scope of the present disclosure.

Figure 2:
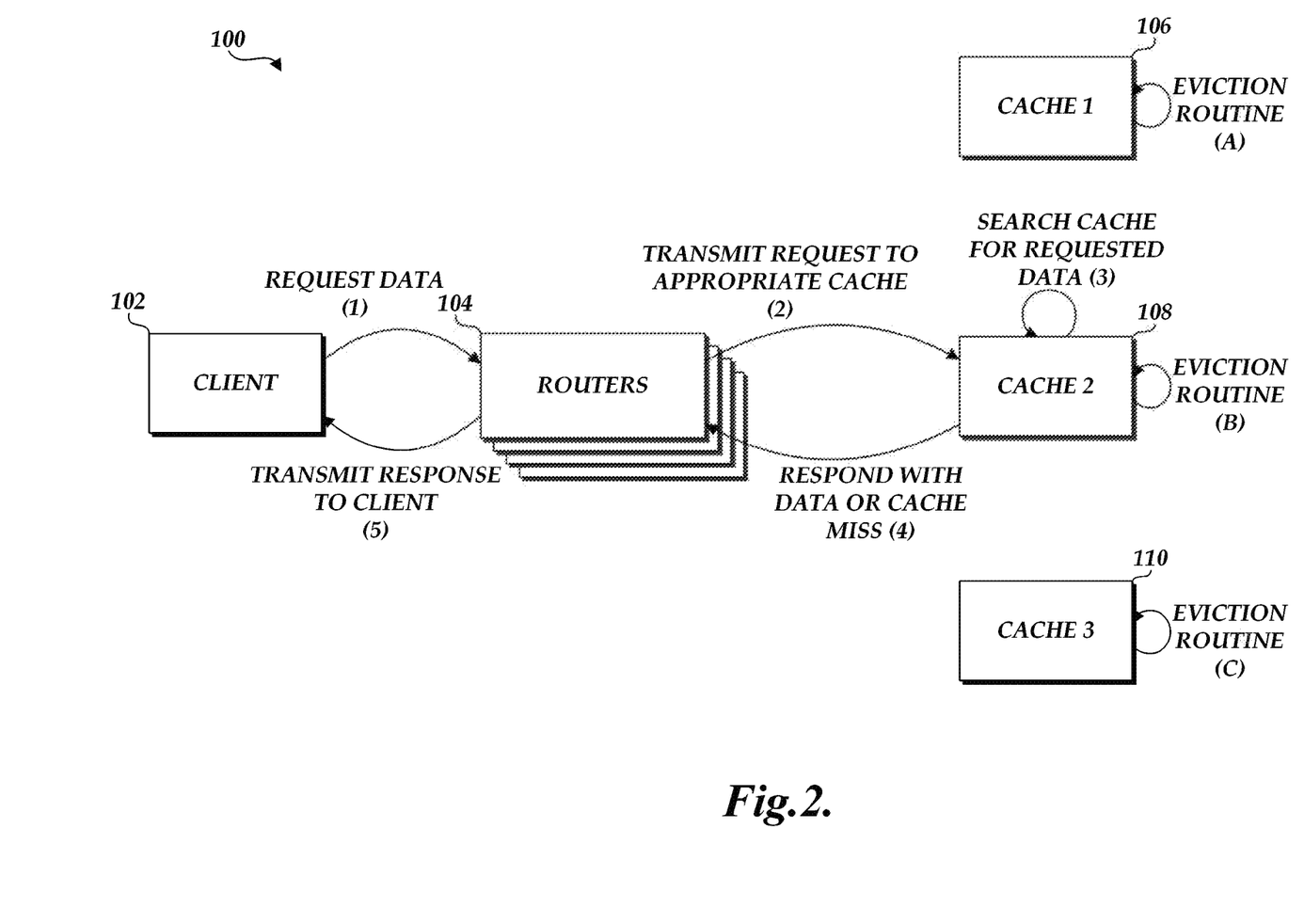
FIG. 2 is a block diagram of the interaction between the various components of the multicache storage environment during a search for cached data.

FIG. 2 depicts an illustrative interaction between the various components of the multicache storage environment 100 of FIG. 1. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, a client 102 initiates a request to the routers 104 for data that may be stored on one of the cache nodes 106, 108, 110. In one embodiment, the request from the client 102 corresponds to a network-based search for travel information. Using the storage policy, one of the routers 104 transmits the request to a cache node 108. As indicated above, the storage policy may indicate which cache node to use based on proximity to the client, subject matter searched for by the client, or the like.

The cache node 108 in turn searches for the data requested. The search may be accomplished using any number of different search algorithms. If the data satisfying the search request is found, also referred to as a cache hit, the cache node 108 responds with the data. One of the routers 104 transmits the data to the client 102. On the other hand, if the data satisfying the search request is not stored in the cache node 108, also referred to as a cache miss, the cache node 108 responds with an indication that the data cannot be found. The client may then search (and/or be redirected to) another network storage resource for the desired data. The client, or some other device, may then transmit the data retrieved from the other resource to the cache node 108 so that the data can be cached for future use within the multicache system 100.

Alternatively, multicache system 100 may include its own data store (not shown) for purposes of long term data storage. Accordingly, in the event of a cache miss, a cache node, such as cache node 108, may obtain the data satisfying the search from the data store, store the data as a cache entry for future reference according to the storage policy, and return the data to the client 102.

One skilled in the art will appreciate that any one of the cache nodes 106, 108, 110 can be used to store and restore the data requested by the client 102. Thus, based on the storage policy the routers 104 may interact with any one, or a combination, of cache nodes 106, 108, 110.

In one embodiment the storage policy also includes a cache manager module (also referred to as a "cache manager"), which can be implemented by any one of, or a combination of, the components of the multicache storage environment 100, such as the cache nodes 106, 108, 110 and/or one or more of the routers 104. The cache manager module may include an eviction routine, which can be performed simultaneously with the caching functions described above and which can evict cache entries from each cache node. The cache entries can be evicted based on any number of criteria including, but not limited to, age, time of first storage, time of last access, size, storage location, and the like. As illustrated in FIG. 2, each cache node can implement the eviction routine individually. The eviction routines can run in parallel in each cache node 106, 108, 110, or can run serially. Alternatively, the eviction routine can be implemented by one or more of the routers 104, or a separate storage manager (not shown). In one embodiment, the eviction routine checks each cache entry in a cache node 106, 108, 110 and evicts the cache entry based on its time stamp. As will be described in greater detail below, with reference to FIG. 3, in one embodiment, the eviction routine dynamically evicts cache entries once a cache capacity threshold is reached.

Figure 3:
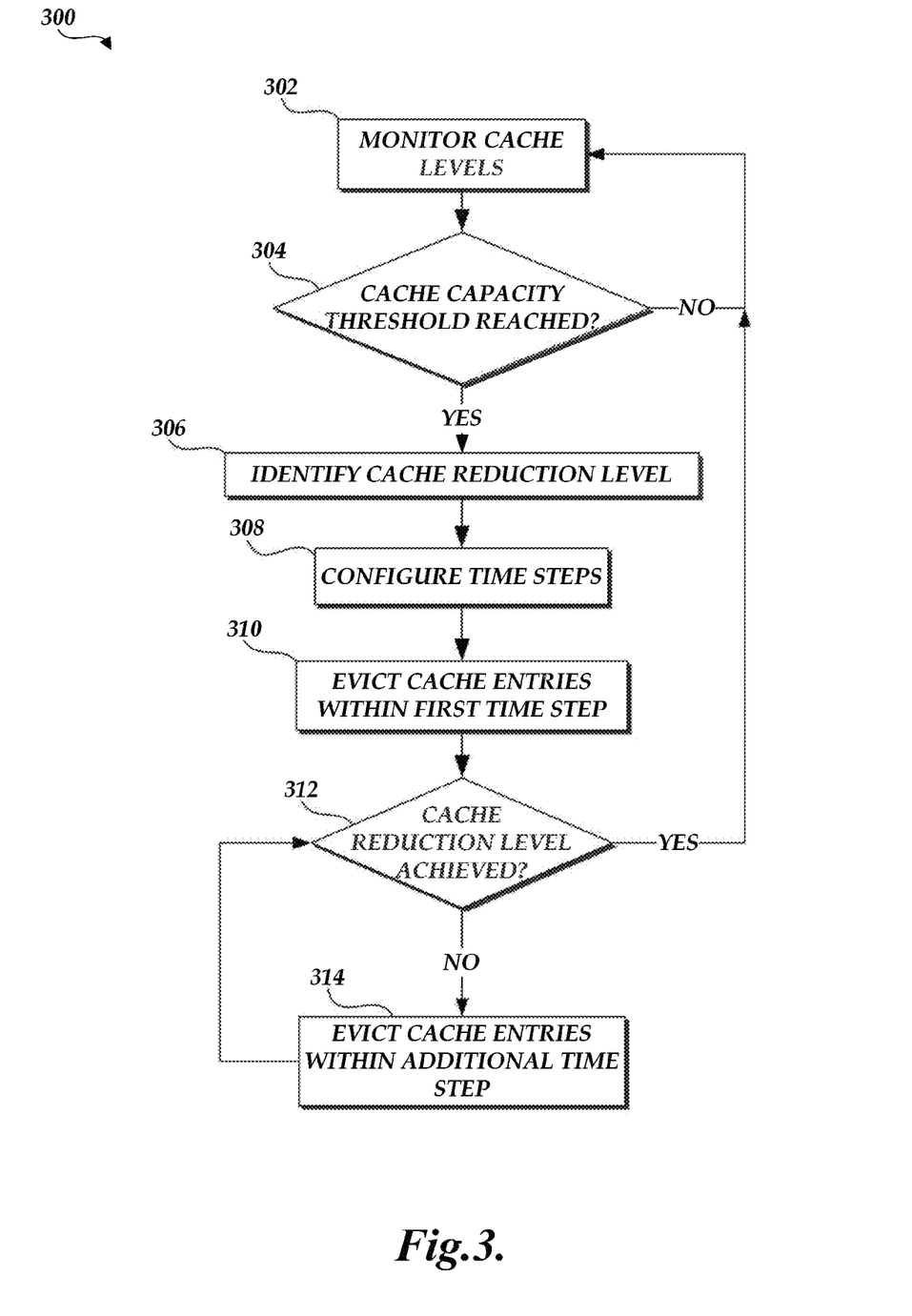
FIG. 3 is a flow diagram illustrative of one embodiment of a routine implemented by a cache manager for dynamically evicting cache entries from a cache node.

FIG. 3 is a flow diagram illustrative of one embodiment of a routine 300 implemented by a cache manager for dynamically evicting cache entries from a cache node. For example, routine 300 can apply to embodiments described in reference to FIGS. 1 and 2. One skilled in the relevant art will appreciate that the elements outlined for routine 300 may be implemented by one or many computing devices/components that are associated with the multicache storage environment, described in greater detail above with reference to FIGS. 1 and 2. For example, routine 300 can be implemented by any one, or a combination, of router(s) 104, the cache nodes 106, 108, 110, a storage manager, and the like. Accordingly, the following illustrative embodiments should not be construed as limiting.

At block 302, the cache manager monitors the cache levels of a cache node. The cache manager can measure various parameters of the cache node, such as the number of reads from and writes of data to and from the cache node, the overall storage capacity of the cache node and the amount of the capacity of the cache node used, as a percentage and/or in storage size values (byte, MB, GB, TB, etc.), the number of requests received by the cache node from a client, the current eviction settings, available storage capacity, eviction rates, etc. Other parameters can be monitored by the cache manager to be able to correctly assess the overall status of the cache node without departing from the spirit and scope of the disclosure.

At decision block 304, the cache manager determines whether a cache capacity threshold (also referred to as a "capacity threshold" or "storage capacity threshold") has been reached. The cache capacity threshold can be used by the cache manager to determine an appropriate time to reduce the number of cache entries in the cache node. In one embodiment, the cache capacity threshold represents an amount of available storage capacity that, when crossed, may increase the risk of failures at the cache node. For example, cache nodes where the cache capacity threshold has been exceeded may run out of storage space for new cache entries. As such, the cache node may stop writing any new cache entries or begin randomly overwriting cache entries to make room for the new data. In either, case the system performance can be adversely affected resulting in slower response times for the client.

As such, setting the appropriate cache capacity threshold allows the cache manager adequate time to evict cache entries and make room for new data before the cache node runs out of storage space. Setting the cache capacity threshold too low may lead to the eviction of useful cache entries and result in additional cache misses. Setting the cache capacity threshold too high may not allow the cache manager sufficient time to evict cache entries and may lead to some of the problems mentioned above. In either case, system performance can be adversely affected and lead to slower response times for the client. Thus a balance between the cost of cache misses and the cost of running out of storage capacity can be used to determine an appropriate cache capacity threshold.

The cache capacity threshold can be implemented in a variety of ways, such as a percentage of the storage capacity of the cache node, a storage size, remaining available storage capacity, and the like. The cache capacity threshold can be represented as a percentage or an actual storage amount. In one embodiment, the cache capacity threshold is a percentage of the overall storage capacity of the node. For example, in a cache node with a storage capacity of 1 terabyte (TB), the cache capacity threshold can be 90% of the storage capacity. Thus, in this example, the cache capacity threshold can be represented as 90% or 900 gigabytes (GB).

Furthermore, the cache capacity threshold can be predetermined or determined on an ad-hoc basis. In addition to balancing the cost of cache misses and lack of storage capacity, a number of different parameters can be used to determine an appropriate cache capacity threshold, such as the overall storage capacity of the cache node, average traffic experienced by the node, current traffic experienced by the node, expected traffic, computing power and speed of the cache node, and the like. The various parameters can be used alone, or in combination, to determine the appropriate cache capacity threshold.

In determining the capacity threshold, cache nodes with larger storage capacity may be capable of having a higher cache capacity threshold than cache nodes with smaller storage capacity because each byte of data in the cache nodes with greater storage capacity accounts for a smaller percentage of the overall storage capacity of the cache node. For example, a cache node with 1 TB of storage may have a cache capacity threshold of 90% or 900 GB, where a cache node with 500 GB of storage may have a cache capacity threshold of 80% or 400 GB. Thus, in both cases, despite a different capacity threshold percentage, 100 GB of storage capacity remains once the cache capacity threshold is reached.

As mentioned above, the cache capacity threshold can also be determined based on the volume of traffic experienced by the cache node. The volume of traffic used may be based at least in part on average of past traffic patterns at a time of day, season, etc., and/or may be based at least in part on current traffic. For example, a cache node experiencing relatively small amounts of traffic may have a higher cache capacity threshold than a cache node with relatively large amounts of traffic. A lower cache capacity threshold may give a cache node experiencing higher traffic additional time to evict cache entries before running out of storage space. Furthermore, during certain times of the day, week, month or year, the cache node may experience higher, or lower, volumes of traffic. At those times the cache capacity threshold can be adjusted accordingly.

In addition, other parameters may be used, in addition to or alternatively, to determine the appropriate cache capacity threshold. For example, the cache capacity threshold can be based on the computing power and speed of the cache node. Cache nodes with slower storage devices or with less computing power may require additional time to evict cache entries. Thus, the storage capacity of these cache nodes can be decreased to provide adequate time for eviction. In addition, a number of different parameters can be used in combination to determine the appropriate cache capacity threshold. Furthermore, as mentioned above, as the cache manager detects changes in the cache node, the cache capacity threshold can be changed accordingly.

With continuing reference to block 304 of FIG. 3, if the cache manager determines that the cache capacity threshold has not been reached, the cache manager continues to monitor cache levels, as illustrated in block 302. On the other hand, if the cache manager determines that the capacity threshold has been reached, the cache manager identifies a cache reduction level (also referred to as a "reduction level" or "storage reduction level"), as illustrated in block 306. The cache reduction level can be used by the cache manager to determine the number of cache entries, or the amount of data, that should be evicted. Similar to the capacity threshold, the reduction level can be represented as a percentage or an actual storage amount. Thus, in the example above with a 1 TB cache node, the reduction level may be 10%, or 100 GB.

The higher the reduction level, the more data will be removed. However, if the reduction level is too high, useful cache entries may be evicted, resulting in an increase in cache misses. Conversely, if the reduction level is too low, the capacity threshold may be reached again in a short amount of time, resulting in computing power being diverted away from reading and writing cache entries to and from the cache node. Either way, whether the reduction level is too high or too low, the system performance can suffer resulting in slower client response times. Thus, as will be described in more detail below, balancing the cost of cache misses with the cost of implementing the eviction routine can provide a guide for determining a reduction level size.

Similar parameters to those mentioned above with respect to determining the capacity threshold can also be used to determine the appropriate reduction level size. Thus, the cost of a cache miss, the storage capacity of the cache node, the amount of traffic received at the cache node, and the processing power and speed of the cache node, as well as other parameters, can all be used in determining the cache reduction level without departing from the spirit and scope of the present disclosure. Furthermore, the reduction level can be predetermined or determined on an ad-hoc basis, taking into account the current status of the cache node, as mentioned above.

With continued reference to FIG. 3, once the cache reduction level has been identified in block 306, the cache manager configures one or more time steps, as illustrated in block 308. In one embodiment, a time step is used to group the cache entries stored in the cache node by units of time (e.g., 5 seconds, 20 milliseconds, 1 minute, etc.). Although described in terms of "time steps," other methods of grouping the cache entries are envisioned without departing from the spirit and scope of the present disclosure. For example, cache entries can be effectively grouped based on their size, frequency of use, storage location, and the like. The number of time steps and size of each time step can be predetermined or determined on an ad-hoc basis. Determining the appropriate size and number of time steps is described in greater detail below with reference to FIGS. 4A-4C.

Returning to FIG. 3, at block 310 the cache manager evicts the cache entries within the first time step. Eviction may refer to deleting a cache entry, deleting an indication that the cache entry is present, and the like. The cache manager can implement the eviction in a variety of ways. For example, the cache manager may synchronize the beginning of the first time step to the time stamp of the oldest cache entry or synchronize the beginning of the first time step to a cache entry based on the grouping mechanism used. Thus, as least one cache entry belongs to the first time step. The cache manager may then evict the oldest cache entry, along with any other cache entries located within the first time step.

In another example, the cache manager compares the time stamp of each cache entry in the cache node to the first time step. If the time stamp falls within the range of time indicated by the first time step, the cache entry is evicted. Thus, upon completion of passing through all cache entries in the cache node, all cache entries with a time stamp within the range of time indicated by first the time step are evicted.

In yet another example, the cache manager compares the time stamp of each cache entry in the cache node to the configured time steps. The cache manager notes to which time step each cache entry belongs. Upon completion of passing through each cache entry, the cache manager will have sufficient information to identify the time step to which each cache entry belongs. Using the information, the cache manager evicts each cache entry within the first time step. Other variations and methods may be used to evict the cache entries without departing from the spirit and scope of the present disclosure.

At determination block 312, the cache manager determines if the reduction level has been achieved by evicting the cache entries from the first time step. If the cache manager determines that the reduction level has been achieved, the cache manager returns to block 302 and continues monitoring the cache levels of the cache node. In one embodiment, to make this determination, the cache manager compares a percentage of the amount of data removed with a percentage reduction level. If the percentage of the amount of data removed is greater than or equal to the percentage reduction level, then the cache manager determines that the reduction level has been achieved. In another embodiment, the amount of available storage after the eviction is compared with the amount of available storage capacity reduction level. If the amount of available storage capacity equals or exceeds the reduction level, the cache manager determines that the reduction level has been achieved.

On the other hand, if the cache manager determines that the reduction level has not been achieved, the cache manager evicts the cache entries within an additional time step, as illustrated in block 314. The additional time step may be the next time step, according to the method used to configure the time steps. Alternatively, the additional time step may be any one of the configured time steps. In one embodiment, the additional time step is the next chronological time step. In another embodiment, the additional time step is not the next chronological time step, but is selected based on any number of parameters, such as storage location, size, range of time, pseudo-random selection, etc. In one embodiment, a subsequent time step is the proximate time step analyzed by the cache manager to evict cache entries, regardless of the order of the time steps according to the method used to configure the time steps. As discussed previously, the cache manager can evict the cache entries in a number of ways. For example, the cache manager compares each cache entry with the time step. Cache entries within the time step are evicted, while cache entries outside the time step are not. In another example, the time stamp of each cache entry is compared with the range of time indicated by the time step. Cache entries with time stamps within the range of time are evicted. In yet another example, the cache manager refers to the information regarding to which time step each cache entry belongs and evicts the cache entries identified as belonging to the current time step based on said information.

Upon evicting the cache entries in an additional time step, the cache manager returns to block 312 and determines if the reduction level has been achieved by evicting the cache entries from the additional time step, as described in greater detail above. Similarly, as described above, if the cache manager determines that the reduction level has been achieved, the cache manager continues monitoring the cache level. If the cache manager determines that the reduction level has not been achieved, the cache entries in yet another time step are evicted, as described above. This process continues until the reduction level is achieved.

As noted earlier, the routine 300 is generally described as being implemented by a cache manager. The cache manager, however, can be a cache manager module implemented by any one of, or a combination of, the components of the multicache storage environment, such as a cache node 106, 108, 110, one or more routers 104 or the like. For example, any one of cache nodes 106, 108, 110 can implement routine 300, while also reading and writing cache entries in response to requests from client 102. One skilled in the art will appreciate that routine 300 can include fewer, more, or different blocks than those illustrated in FIG. 3 without departing from the spirit and scope of the description. For example, prior to evicting cache entries in an additional time step, the storage manage can verify that additional time steps remain. If no more time steps remain, the cache manager can return to block 302 and continue monitoring the cache levels.

Alternatively, or in addition, after a reduction level has been achieved and prior to returning to block 302, the cache manager can determine if the used storage capacity is less than the capacity threshold. If not, the cache manager, can alter the reduction level to decrease the amount of used storage below the capacity threshold, and continue evicting cache entries from the already configured time steps. In addition, in determining the reduction level, the cache manager can verify that the reduction level will decrease the amount of used storage below the storage capacity threshold amount.

In addition, rather than configuring time steps and evicting cache entries within the time steps, the cache manager may decrease an expiration time so that cache entries are routinely evicted in less time. The cache manager may incrementally decrease the expiration time until the reduction level is reached. Upon reaching the reduction level, the cache manager may leave the expiration time the same or incrementally increase the expiration time based on traffic and other factors as described previously.

Moreover, upon determining that the reduction level has not been achieved, the cache manager can alter the subsequent time step to increase or decrease the amount of cache entries found therein. The cache manager may alter the step size of the subsequent time step based on the remaining amount of data to be evicted to achieve the reduction level, or may alter the step size based on the amount of data in the previous time step, the number of cache entries in the previous time step, or the like. For example, if the reduction level is 20% and the first and second time step only achieve a 5% reduction, the cache manager can increase the size of the third time step to more likely achieve the reduction level once the cache entries from the third time step are evicted. Using the same example, if in the first and second time step a 19% reduction is achieved, the cache manager can decrease the size of the third step to avoid evicting too many cache entries. Accordingly, the cache manager can alter the size of each time step based on the results of the previous time step.

Furthermore, the blocks depicted in FIG. 3 may be performed in a different order or in parallel. For example, the cache manager may configure the time steps, as illustrated in block 306, prior to determining the cache reduction level, as illustrated in block 308. Alternatively, the cache manager may determine the cache reduction level and configure the time steps in parallel. Thus, the routine 300 may be altered in a variety of ways without departing from the spirit and scope of the present disclosure.

Now that a cache eviction routine using time steps has been described, determining the appropriate size and number of time steps will be described in greater detail with reference to FIGS. 4A-4C. As noted above, each cache entry includes a time stamp. Thus, cache entries may be sorted by each entry's respective time stamp, e.g., chronologically. The time stamp may indicate a time when the cache entry was first stored in the cache node or the time stamp may indicate a last time the cache entry was accessed. Accordingly, a first time step may begin with the oldest cache entry as indicated by the time stamp and the last time step may end at an end position, such as the newest cache entry, a current time, or some other time, any of which may be determined with reference to a time stamp. The size of the time steps may vary on an ad-hoc basis or in a predetermined manner. For example, the size of each time step may increase or decrease based on the number of cache entries in a previous time step. As another example, the step sizes are uniform based on the number of time steps used. As yet another example, the time steps are evenly spaced from the oldest cache entry until the end position.

In one embodiment, the step sizes range from 0% to 100% of the distance (in terms of time or some other parameter) between the first cache entry and the end position.

As an example, the time between the first cache entry and an end position is four minutes and a uniform step size of 25% is used. Thus, the time between the oldest cache entry and the end position is broken up into four distinct time steps and the size of each time step is one minute. Each time step includes all cache entries with a time stamp occurring within its respective minute. As mentioned previously, each time step may or may not include a uniform number of cache entries. Thus, each time step may contain a different percentage of cache entries. In the example used above, the first time step may contain 15% of the cache entries, and the second, third and fourth time steps may include 30%, 35%, and 20% of the cache entries, respectively.

Similar to the capacity threshold and the reduction level, the size of steps can adversely affect the efficacy of the eviction routine. Too large of steps (or too few) can lead to the eviction of too many cache entries resulting in an increase in cache misses. Too small of steps (or too many) can lead to inordinate amounts of computing resources being used to evict cache entries resulting in a decrease in system response time to a client. Either way, the overall system performance may decrease leading to an increase in the amount of time used to retrieve the requested data for the client.

Figure 4A:
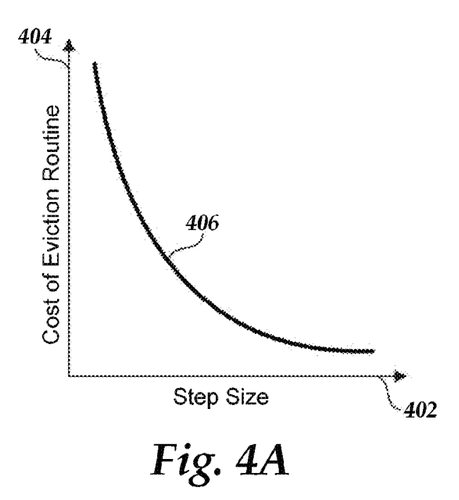
FIGS. 4A-4C are graphical illustrations of a relationship between a cost of implementing an eviction routine and a cost of cache misses.
Figure 4B:
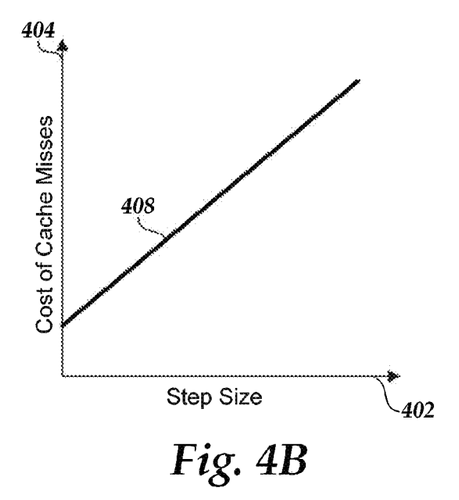
Figure 4C:
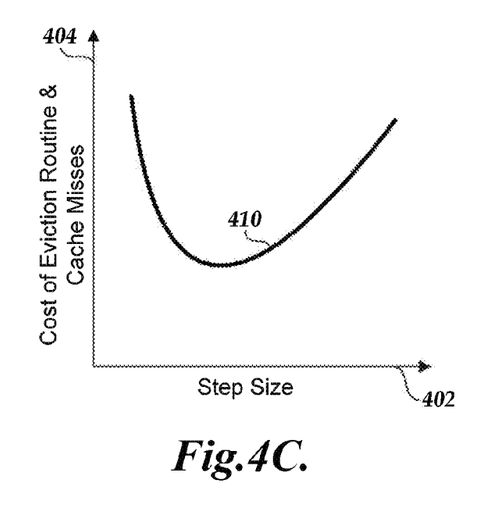

FIGS. 4A-4C, further illustrate the relationship between a uniform step size (and number of time steps), eviction run cost and the cost of cache misses. It is to be understood that the FIGS. 4A-4C are illustrative in nature only, and may vary based on the specifications and parameters of individual cache nodes. FIG. 4A is a graphical illustration of the relationship between step size and eviction run cost. As shown, the x-axis 402 represents a uniform step size of each time step. The y-axis 404 represents the eviction routine cost. The cost may be in terms of processing resources, time, or both. The curve 406 represents the relationship between a uniform step size and the eviction routine cost. In the illustrated example, as the step size increases (and the number of time steps decreases), the cost of the eviction routine decreases significantly. The decrease may be due to the decrease in number of passes by the eviction routine through all of the cache entries in the cache node. In another example, as the step size increases linearly, the cost of the eviction routine decreases exponentially. Thus, according to FIG. 4A, a larger step size (and smaller number of time steps) results in a lower eviction routine cost.

FIG. 4B is a graphical illustration of the relationship between a uniform step size and the cost of cache misses. Similar to FIG. 4A, the x-axis 402 represents a uniform step size of each step. The y-axis 404, however, represents the cost of a cache miss. The cost may be in terms of processing resources, time, or both. The line 408 represents the relationship between the cost of a cache miss and the step size. As illustrated, as the step size increases (and the number of steps decreases), the number of cache misses also increases. If a step size of 100% is used, all cache entries are evicted resulting in cache misses for all different subsequent requests. If a step size of 0 is used (i.e., no time step and no eviction), a relatively small number of cache misses will occur. Thus, according to FIG. 4B, a smaller step size (and larger number of time steps) results in a lower system cost due to cache misses.

FIG. 4C is a graphical illustration of the relationship between a uniform step size, the cost of the eviction routine and the cost of cache misses. Similar to FIGS. 4A and 4B, the x-axis 402 represents a uniform step size of each step. The y-axis 404 represents the cost of the eviction routine and the cost of a cache miss. The curve 410 represents a combination of curve 406 and line 408. As mentioned previously, in one embodiment, the cost associated with each step size is a function of the cost of a subsequent cache miss due to cache entries being evicted combined with the cost of the eviction routine comparing each cache entry to determine if it should be evicted. Thus, according to FIG. 4C, the step size with the lowest cost is a compromise between the cost of cache misses and the cost of eviction routine. In one embodiment, the step size is selected in the region of curve 410 with the lowest system cost.

Other factors can be used alone, or in combination, to determine the step size for each cache node including, but not limited to the size of the cache node, the speed and computing power of the cache node and/or the amount of traffic experienced at a cache node. The size of the cache node, can affect the cost of the eviction routine and/or the cost of cache misses. The larger the cache node the more resources/time used to complete the eviction routine. In addition, there may be fewer cache misses in a larger cache node. The speed and computing power of the cache node can affect both the cost of the eviction routine and the cost of a cache miss as well. For example, all else being equal, a cache miss and/or an eviction routine in a slower cache node will take more time to complete than in a faster cache node. The amount of traffic experienced by the cache node can affect the cost of the cache misses as the number of cache misses will likely go up as the amount of traffic goes up. In addition, amount of traffic can also affect the cost of the eviction routine as the cache node resources could be used reading and writing cache entries as opposed to implementing the eviction routine. These factors, and others, are described in greater detail above.

The step size and number of steps can also be determined based on collected data for each cache node. The data can include average amount of traffic, average age of cache entries, average spacing between cache entries during different times of the day, week, month, or year, and the like. Thus, probability can be used to identify an appropriate step size and number of steps for a cache node.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for evicting cache entries from a cache node, the method comprising:
    under the control of one or more computing devices:
        monitoring storage capacity levels of a cache node storing a plurality of cache entries;
        determining a storage capacity threshold of the cache node has been reached;
        upon determining that the storage capacity threshold has been reached:
            identifying a cache reduction level, the cache reduction level indicating a target cache reduction;
            identifying a first cache entry from the one or more cache entries;
            configuring a plurality of time steps, each time step indicating a range of time, the plurality of time steps including a first time step beginning with the first cache entry and indicating a first range of time;
            identifying one or more time steps of the plurality of time steps in which the plurality of cache entries are located;
            evicting one or more cache entries within the first time step from the cache;
            determining the cache reduction level has not been achieved upon evicting the one or more cache entries within the first time step;
            altering a size of one or more additional time steps based at least on a percentage of the plurality cache entries within the first time step; and
            evicting one or more cache entries within the one or more additional time steps until the cache reduction level is achieved.

2. The computer-implemented method of claim 1, wherein monitoring the storage capacity levels comprises monitoring at least one of an amount of data stored by the one or more cache entries, a number of cache entries, a number of evictions, and an amount of data removed with each eviction.

3. The computer-implemented method of claim 1, wherein the target cache reduction is at least one of a percentage of the storage capacity, and an amount of the storage capacity.

4. The computer-implemented method of claim 1, wherein each cache entry comprises a time stamp and the first cache entry is identified as the cache entry with the oldest time stamp.

5. The computer-implemented method of claim 4, wherein evicting the one or more cache entries within the first time step comprises:
    comparing the time stamp of each cache entry stored in the cache node with the first range of time; and
    evicting each cache entry with a time stamp within the first range of time.

6. The computer-implemented method of claim 4, wherein for each of the one or more additional time steps, evicting one or more cache entries comprises:
    comparing the time stamp of each cache entry stored in the cache node with the range of time of an additional time step; and
    evicting each cache entry with a time stamp within the range of time of the additional time step.

7. The computer-implemented method of claim 1, wherein the number of the plurality of time steps is predefined.

8. The computer-implemented method of claim 1, wherein the size of the plurality of time steps is uniform.

9. The computer-implemented method of claim 1, wherein the cache reduction level is predefined.

10. The computer-implemented method of claim 1, wherein the step size of the plurality of time steps is determined based at least in part on an eviction cost and a cache miss cost.

11. A system comprising:
    one or more cache nodes configured to store a plurality of cache entries; and
    a computing device in communication with the one or more cache nodes, the computing device configured to:
        monitor a storage capacity level of at least one cache node;
        determine a storage capacity threshold of the at least one cache node has been reached;
        upon determining that the storage capacity threshold has been reached:
            identify a cache reduction level, the cache reduction level indicating a target reduction of cache entries in the cache node;
            configure a plurality of time steps, each time step indicating a range of time;
            evict one or more cache entries within a first time step of the plurality of time steps;
            determine the cache reduction level has not been achieved upon evicting the one or more cache entries within the first time step;
            alter a size of one or more additional time steps based at least on a percentage of the plurality cache entries within the first time step; and
            evict one or more cache entries within the one or more additional time steps until the cache reduction level is achieved.

12. The system of claim 11, wherein the computing device is further configured to evict all cache entries within a previous time step before evicting any cache entries within a subsequent time step.

13. The system of claim 11, wherein each cache entry comprises a time stamp.

14. The system of claim 13, wherein to evict the one or more cache entries within the one or more additional time steps, the computing device is configured to:
    compare the time stamp of each cache entry with the range of time of a current time step; and
    evict each cache entry with a time stamp within the range of time of the current time step.

15. The system of claim 11, wherein the cache reduction level is based at least in part on at least one of cost of a cache miss, the storage capacity of the at least one cache node, the amount of traffic experienced by the at least one cache node, and the processing speed of the at least one cache node.

16. The system of claim 11, wherein the storage capacity threshold is based at least in part on at least one of cost of a cache miss, the storage capacity of the at least one cache node, the amount of traffic experienced by the at least one cache node, and the processing speed of the at least one cache node.

17. The system of claim 11, wherein to monitor the storage capacity level the computing device is configured to monitor at least one of an amount of data stored by the one or more cache entries, a number of cache entries, a number of evictions, and an amount of data removed with each eviction.

18. The system of claim 11, wherein the step size of the plurality of time steps is determined based at least in part on an eviction cost and a cache miss cost.

19. A computer-readable, non-transitory storage medium having a computer-executable component for evicting cache entries from a cache node, the computer-executable component comprising:
    a cache manager component operable to:
        monitor a storage capacity level of a cache node storing one or more cache entries;
        determine if a storage capacity threshold of the cache node has been reached;
        upon determining that the storage capacity threshold has been reached:
            configure a plurality of time steps, each time step indicating a range of time;
            evict one or more cache entries within a first time step of the plurality of time steps;
            determine the cache reduction level has not been achieved upon evicting the one or more cache entries within the first time step;
            alter a size of one or more additional time steps based at least on a percentage of the plurality cache entries within the first time step; and
        evict each cache entry within the one or more additional time steps until a cache reduction level is achieved.

20. The computer-readable non-transitory storage medium of claim 19, wherein the cache manager component is further operable to evict all cache entries within a previous time step before evicting any cache entries within a subsequent time step.

21. The computer-readable non-transitory storage medium of claim 19, wherein each cache entry comprises a time stamp.

22. The computer-readable, non-transitory storage medium of claim 21, wherein to evict the one or more cache entries within the one or more additional time steps, the cache manager component is further operable to:
    compare the time stamp of each cache entry with the range of time of a current time step; and
    evict each cache entry with a time stamp within the range of time of the current time step.

23. The computer-readable, non-transitory storage medium of claim 19, wherein the cache reduction level is based at least in part on at least one of the storage capacity of the cache node, the amount of traffic experienced by the cache node, and the processing speed of the cache node.

24. The computer-readable, non-transitory storage medium of claim 19, wherein the storage capacity threshold is based at least in part on at least one of the storage capacity of the cache node, the amount of traffic experienced by the cache node, and the processing speed of the cache node.

25. The computer-readable, non-transitory storage medium of claim 19, wherein the cache manager component is further operable to determine the step size of the plurality of time steps based at least in part on an eviction cost and a cache miss cost.

* * * * *